US012619837B2

(12) United States Patent
Song

(10) Patent No.: US 12,619,837 B2
(45) Date of Patent: May 5, 2026

(54) POSITION IDENTIFICATION METHOD AND SYSTEM

(71) Applicant: HEMA (CHINA) CO., LTD., Pudong New Area (CN)

(72) Inventor: Enliang Song, Shanghai (CN)

(73) Assignee: Hema (China) Co., Ltd., Pudong New Area (CN)

( * ) Notice: Subject to any disclaimer, the term of this patent is extended or adjusted under 35 U.S.C. 154(b) by 0 days.

(21) Appl. No.: 18/994,854

(22) PCT Filed: Jul. 20, 2023

(86) PCT No.: PCT/CN2023/108465
§ 371 (c)(1),
(2) Date: Jan. 15, 2025

(87) PCT Pub. No.: WO2024/017353
PCT Pub. Date: Jan. 25, 2024

(65) Prior Publication Data
US 2026/0017473 A1 Jan. 15, 2026

(30) Foreign Application Priority Data
Jul. 21, 2022 (CN) .......................... 202210860192.8

(51) Int. Cl.
*G06K 7/10* (2006.01)
(52) U.S. Cl.
CPC ..... *G06K 7/10* (2013.01); *G06K 2007/10485* (2013.01)
(58) Field of Classification Search
CPC .................................. G06K 7/10; G06K 7/00
(Continued)

(56) References Cited

U.S. PATENT DOCUMENTS

| 2023/0129609 A1* | 4/2023 | Hou ......................... G09F 3/204 |
| | | 40/5 |
| 2023/0274667 A1* | 8/2023 | Hou ......................... G09F 3/204 |
| | | 340/5.91 |

FOREIGN PATENT DOCUMENTS

| CN | 101504294 A | 8/2009 |
| CN | 101571410 A | 11/2009 |

(Continued)

OTHER PUBLICATIONS

International Search Report issued in App. No. PCT/CN2023/108465 on Oct. 20, 2023.

*Primary Examiner* — Edwyn Labaze
(74) *Attorney, Agent, or Firm* — Medler Ferro Woodhouse & Mills PLLC

(57) ABSTRACT

A position identification method and system are provided. The position identification method is applied to a position identification system. The system includes: a power supply guide rail provided with positioning mark information, and an electronic shelf label installed on the power supply guide rail and provided with a photoelectric geminate transistor. The electronic shelf label reads corresponding positioning mark information on the power supply guide rail on the basis of the photoelectric geminate transistor, and determines a target position on the power supply guide rail according to the positioning mark information. By means of determining a target position of an electronic shelf label on a power supply guide rail according to positioning mark information of the electronic shelf label on the power supply guide rail, a self-positioning capability of the electronic shelf label is realized at a low cost, and the accuracy of positioning can be ensured.

18 Claims, 3 Drawing Sheets

When it is determined that the power supply guide rail supplies power, the electronic shelf label reads corresponding positioning mark information on the power supply guide rail on the basis of the photoelectric geminate transistor, and determines a target position on the power supply guide rail according to the positioning mark information

102

(58) Field of Classification Search
USPC ........................................ 235/454, 435, 375
See application file for complete search history.

(56)                     References Cited

FOREIGN PATENT DOCUMENTS

| CN | 107864679 | A | * | 3/2018 | ......... G06Q 30/0631 |
|----|-----------|---|---|--------|-----------------------|
| CN | 210083239 | U |   | 2/2020 | |
| CN | 114492712 | A |   | 5/2022 | |
| CN | 114787765 | A | * | 7/2022 | .............. G09G 3/06 |
| CN | 115392272 | A |   | 11/2022 | |
| CN | 117321657 | A | * | 12/2023 | ............. G09F 3/208 |

* cited by examiner

102

When it is determined that the power supply guide rail supplies power, the electronic shelf label reads corresponding positioning mark information on the power supply guide rail on the basis of the photoelectric geminate transistor, and determines a target position on the power supply guide rail according to the positioning mark information

FIG. 1

FIG. 2

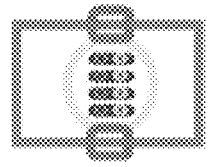
an electronic shelf label having four photoelectric geminate transistors integrated on the back part

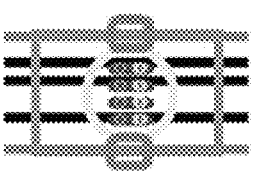
the electronic shelf label being installed on a guide rail

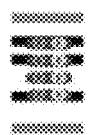
the shelf label sensing a position code 0010

FIG. 3

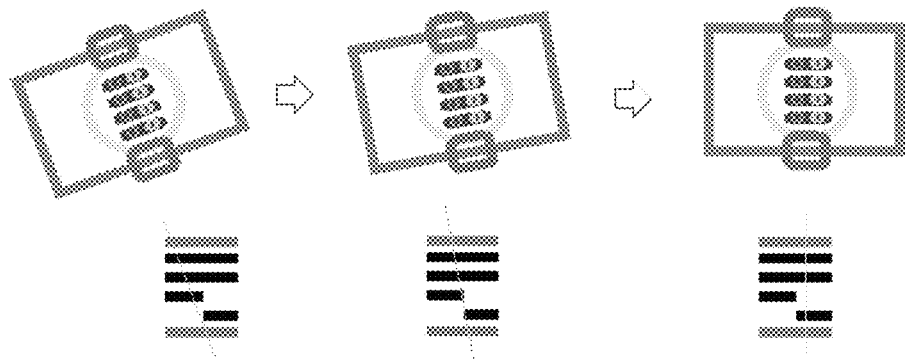

FIG. 4

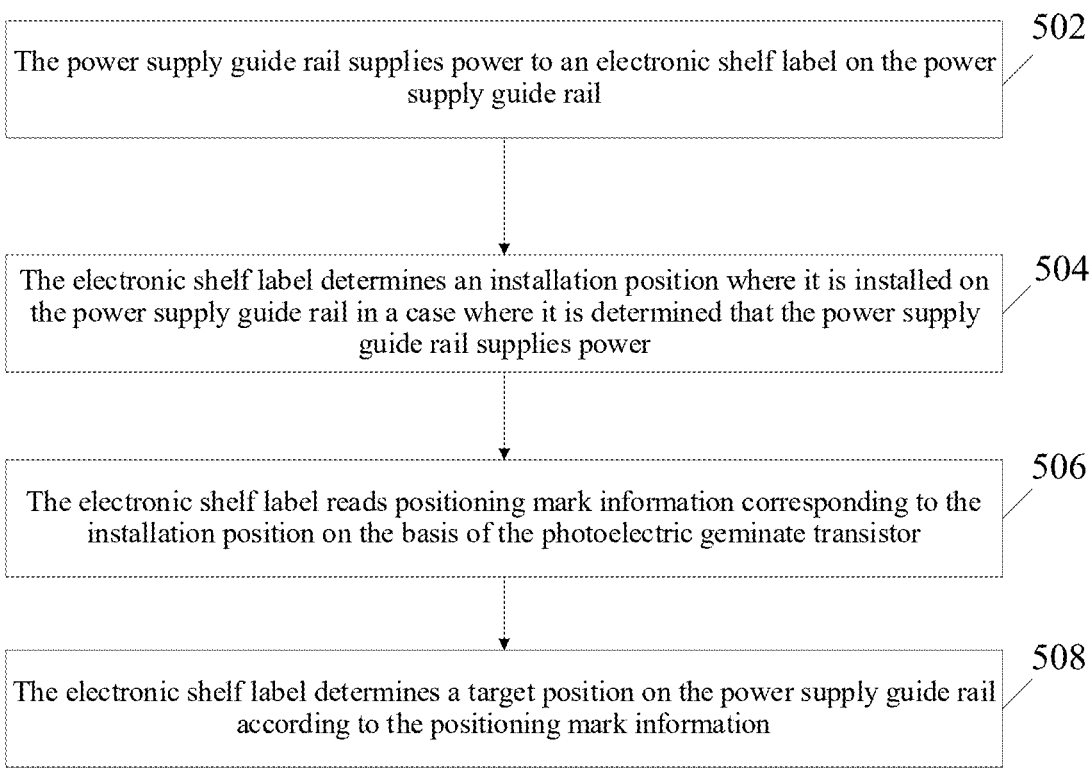

502

The power supply guide rail supplies power to an electronic shelf label on the power supply guide rail

504

The electronic shelf label determines an installation position where it is installed on the power supply guide rail in a case where it is determined that the power supply guide rail supplies power

506

The electronic shelf label reads positioning mark information corresponding to the installation position on the basis of the photoelectric geminate transistor

508

The electronic shelf label determines a target position on the power supply guide rail according to the positioning mark information

FIG. 5

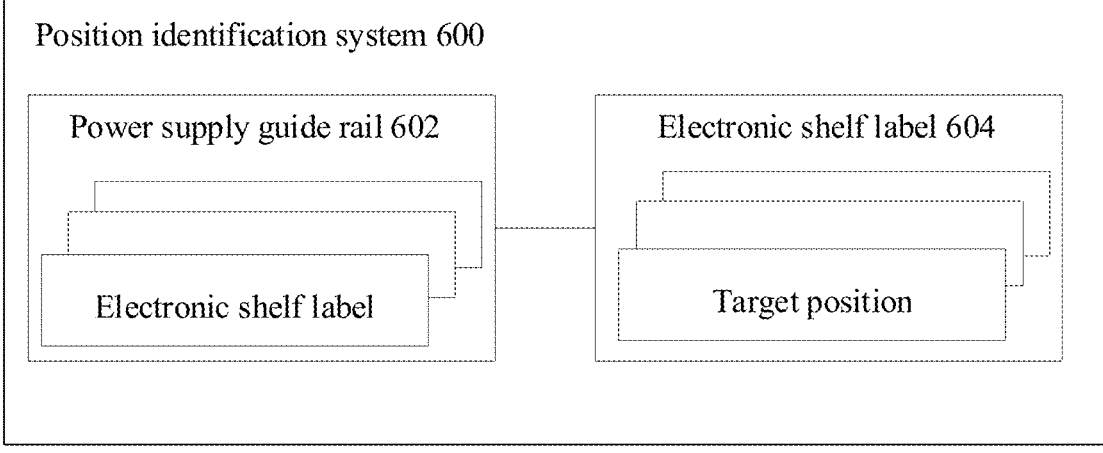

Position identification system 600

Power supply guide rail 602

Electronic shelf label

Electronic shelf label 604

Target position

FIG. 6

POSITION IDENTIFICATION METHOD AND SYSTEM

The present application claims priority to Chinese Patent Application No. 202210860192.8, filed with the China Patent Office on Jul. 21, 2022 and titled "POSITION IDENTIFICATION METHOD AND SYSTEM", which is incorporated herein by reference in its entirety.

TECHNICAL FIELD

Embodiments of this specification relate to the technical field of smart device, and in particular, to a position identification method. One or more embodiments of this specification also relate to a position identification system, a computing device, and a computer-readable storage medium.

BACKGROUND

An electronic shelf label (ESL) is an electronic display apparatus placed on a shelf to replace a paper shelf label and used to display commodity information such as the price, name and origin of a product. The electronic shelf label may receive shelf label information issued by a server and display, on its display screen, commodity information in the shelf label information, reducing the cost of changing commodity information for the paper shelf label and improving the update efficiency.

Commodity display inspection is a high-frequency rigid demand in the retail industry. At present, commodity display inspection needs an inspector to determine placement positions of each electronic shelf label and a corresponding commodity, and compare placement positions of all electronic shelf labels with a display effect diagram, thereby finding out an incorrectly placed commodity object. This way of inspection may consume a lot of labor costs and time costs. There is another way of inspection where an inspector confirms display information of an electronic shelf label through image identification, and then determines whether a position of the electronic shelf label and its corresponding commodity are placed correctly. This way of inspection raises high requirements on an image identification system, resulting in too high implementation costs. Therefore, how to implement automatic determination of a placement position of an electronic shelf label in a low-cost manner is an urgent problem to be solved at present.

SUMMARY

In view of this, embodiments of this specification provide a position identification method. One or more embodiments of this specification also relate to a position identification system, a computing device, a computer-readable storage medium, and a computer program, so as to solve the technical defects in the existing technologies.

According to a first aspect of the embodiments of this specification, there is provided a position identification method, applied to a position identification system including a power supply guide rail provided with positioning mark information, and an electronic shelf label installed on the power supply guide rail and provided with a photoelectric geminate transistor.

The electronic shelf label reads corresponding positioning mark information on the power supply guide rail on the basis of the photoelectric geminate transistor, and determines a target position on the power supply guide rail according to the positioning mark information.

According to a second aspect of the embodiments of this specification, there is provided a position identification system including a power supply guide rail provided with positioning mark information, and an electronic shelf label installed on the power supply guide rail and provided with a photoelectric geminate transistor.

The electronic shelf label is configured to read corresponding positioning mark information on the power supply guide rail on the basis of the photoelectric geminate transistor, and determine a target position on the power supply guide rail according to the positioning mark information.

According to a third aspect of the embodiments of this specification, there is provided a computing device including a memory, a processor, and computer instructions stored in the memory and executable on the processor, wherein the processor, when executing the computer instructions, implements steps of the position identification method as described.

According to a fourth aspect of the embodiments of this specification, there is provided a computer-readable storage medium, which stores computer instructions that, when executed by a processor, implement steps of the position identification method as described.

According to a fifth aspect of the embodiments of this specification, there is provided a computer program, wherein when the computer program is executed in a computer, the computer is caused to execute steps of the position identification method described above.

The position identification method provided in this specification is applied to a position identification system including a power supply guide rail provided with positioning mark information, and an electronic shelf label installed on the power supply guide rail and provided with a photoelectric geminate transistor. The electronic shelf label reads corresponding positioning mark information on the power supply guide rail on the basis of the photoelectric geminate transistor, and determines a target position on the power supply guide rail according to the positioning mark information. Since the power supply guide rail in the system is provided with the positioning mark information, and the electronic shelf label is provided with the photoelectric geminate transistor, after the electronic shelf label is installed on the power supply guide rail, the electronic shelf label may read the positioning mark information of a position where it is located on the basis of the photoelectric geminate transistor, thereby quickly and accurately acquiring the position on the power supply guide rail where it is located.

BRIEF DESCRIPTION OF THE DRAWINGS

FIG. 1 is a flow chart of a position identification method provided in an embodiment of this specification;

FIG. 2 is a schematic diagram of position codes of a power supply guide rail provided in an embodiment of this specification;

FIG. 3 is a schematic structural diagram of an electronic shelf label provided in an embodiment of this specification;

FIG. 4 is a schematic diagram of installation of an electronic shelf label provided in an embodiment of this specification;

FIG. 5 is a flow chart of a processing process of a position identification method provided in an embodiment of this specification;

FIG. 6 is a schematic structural diagram of a position identification system provided in an embodiment of this specification.

DETAILED DESCRIPTION

Figure 7:
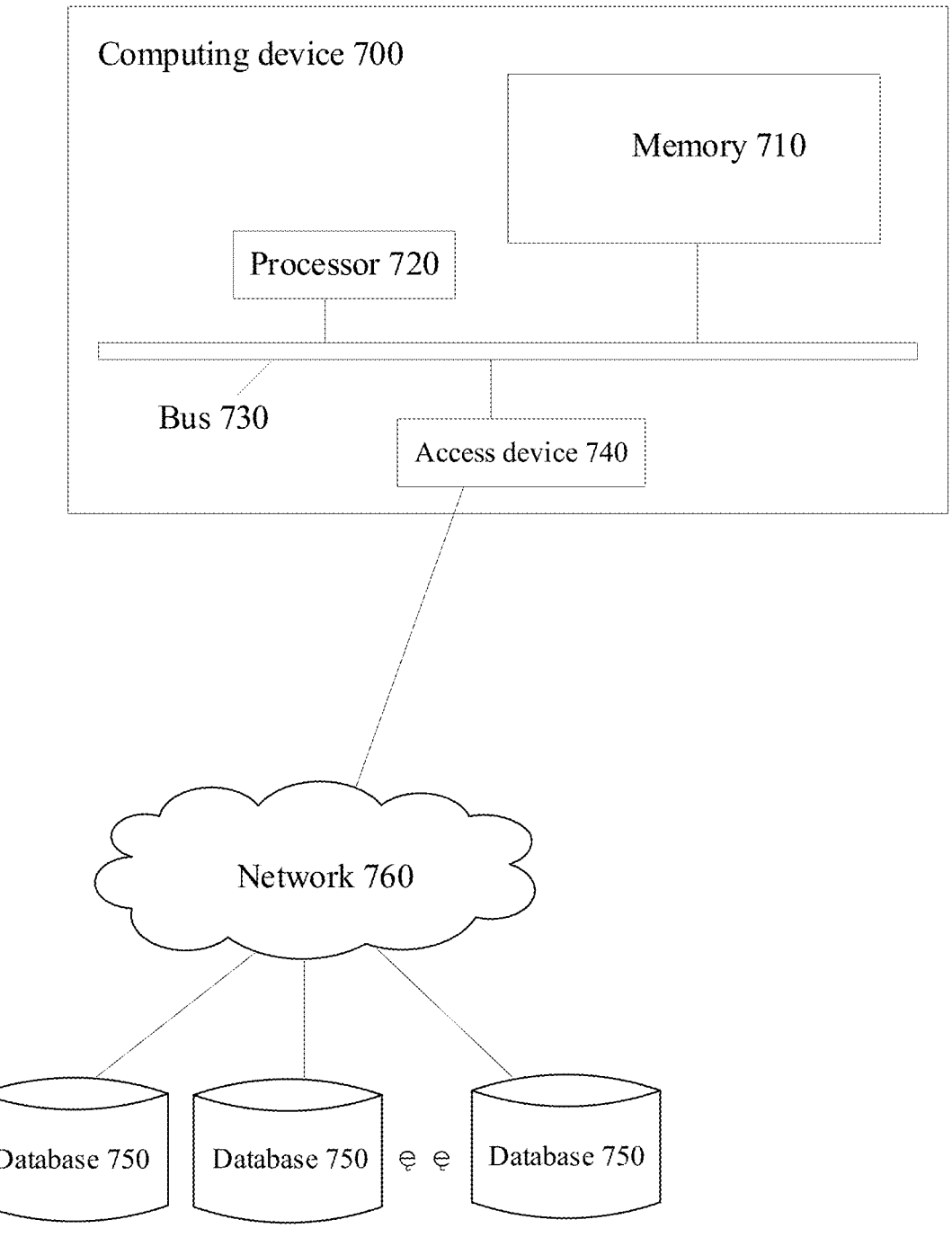
FIG. 7 is a structural block diagram of a computing device provided in an embodiment of this specification.

Many specific details are set forth in the following description to facilitate a thorough understanding of this specification. However, this specification can be implemented in many other manners different from those described here, and those skilled in the art may make similar generalization without departing from the connotation of this specification. Therefore, this specification is not limited by the specific implementations disclosed below.

The terms used in one or more embodiments of this specification are only for the purpose of describing particular embodiments, and are not intended to limit one or more embodiments of this specification. Singular forms of "a/an", "the" and "this" used in one or more embodiments of this specification and the appended claims are also intended to include plural forms, unless otherwise clearly indicated in the context. It should also be understood that the term "and/or" used in one or more embodiments of this specification refers to any or all possible combinations including one or more associated listed items.

It should be understood that although various information may be described employing terms such as first and second in one or more embodiments of this specification, such information should not be limited by these terms. These terms are only used to distinguish information of the same type from each other. For example, without departing from the scope of one or more embodiments of this specification, a first one may also be referred to as a second one, and similarly, the second one may also be referred to as the first one. Depending on the context, the word "if" as used here may be interpreted as "as" or "when" or "determining . . . in response to . . . ".

First, nouns and terms involved in one or more embodiments of this specification will be explained.

Electronic shelf label is an electronic display apparatus with information sending and receiving functions, which is mainly applied in supermarkets, convenience stores, pharmacies and other electronic tags that display price information. As an electronic display apparatus that is placed on a shelf and may replace a traditional paper price label, each electronic shelf label is connected with a computer database of a shopping mall through a wired or wireless network, and displays the latest commodity information through a screen on the electronic shelf label.

Photoelectric geminate transistor is also known as a photoelectric switch, an internal structure of which has one light-emitting diode and one photosensitive triode. After a modulated pulse generated by an oscillating circuit passes through a transmitting circuit, an optical pulse is radiated by the light-emitting diode. When a measured object enters the range of action of a light receiver, the optical pulse that is reflected back enters the photosensitive triode. In a receiving circuit, the optical pulse is demodulated into an electrical pulse signal and next amplified by an amplifier and shaped through synchronous gating, then interference is eliminated by a digital integral photoelectric switch or RC integral approach, and finally a driver is triggered to output a photoelectric switch control signal after delay (or without delay).

A spatial position where an electronic shelf label is located may be used to check whether a current placement of goods is consistent with expectations, and check whether the electronic shelf label is in conformity with the goods. By accurately acquiring the position of the electronic shelf label on the shelf, the accuracy of commodity display can be ensured, reducing the complaint rate and compliance risk caused by a non-correspondence between the shelf labels and the commodities. The accurate spatial position of the electronic shelf label provides a basis for the availability of a picking lighting system. The real-time and accurate spatial position of the electronic shelf label, which is added with a beacon emission function, ensures the real time and accuracy of positioning anchor information necessary for the indoor navigation function. The indoor positioning capability is the important infrastructure in the digital strategy of operation of a shopping mall or supermarket. ESLs (electronic shelf labels) powered by guide rails are widely distributed in a shopping mall, a supermarket and other retail stores. Through effective design strategies and solutions, ESL hardware is shared as the positioning anchor infrastructure in a guide rail powered ESL area to implement the spatial positioning capability that meets the digital operation demands, which can release more potentials of the ESL infrastructure and greatly shrink the equipment investment and maintenance investment for the positioning capability construction. In conjunction with new retail scenarios, more demands other than the price information display function have been developed, which endows the electronic shelf label with a higher ROI (return on investment) and provides a basis for wider popularization and application of the electronic shelf label.

Electronic shelf label (ESL), as the digital infrastructure of shopping malls and supermarkets in the retail industry, has been replicated in large quantities in the industry. Expectedly, through simple low-cost hardware and software upgrades, and addition of ESL's own fine positioning related basic capabilities, mining of more digital values from the ESL hardware in the retail scenarios will be implemented. An ESL of the Bluetooth technology which is added with the standard Beacon positioning signal source function is restrained by the positional uncertainty brought by ESL position adjustment and becomes difficult to be popularized. Layout inspection is a high-frequency rigid demand in the retail industry. Automatic layout inspection is a method that expectedly may detect an ESL positional disorder, confirm ESL display information through image identification, and then affirm an ESL identity, which puts higher requirements on the performance index of an image acquisition system and hinders the low-cost implementation of an automation solution required so.

In the existing technologies, the self-positioning function of an electronic shelf label is implemented by an independently deployed positioning beacon system, and the logistics and warehousing industry generally adopts an independently deployed positioning beacon system. An independently deployed positioning beacon system generally requires that at least one beacon is deployed within a 5-meter grid. In a shopping mall or supermarket scenario, the disadvantages of the independently deployed beacon system include: a separate system, independent cost, high hardware cost, one-time use, limited service life of equipment, high maintenance expenditure in the later period, limited installation position due to site conditions, needs for professional deployment staff and tool systems, limited deployment density, Bluetooth fingerprint technology is generally adopted to calculate positions and needs to collect fingerprint data on site since.

In the existing technologies, the self-positioning function of an electronic shelf label is also implemented by a RFID positioning system. In a system using the RFID anchor positioning, RFID patches need to be evenly and densely distributed on an electronic shelf label guide rail, and a RFID card-reading chip needs to be configured on the electronic shelf label. The RFID card-reading chip reads ID information of the guide rail RFID patches, and then finds a corresponding ID number in a guide rail RFID position map drawn in advance to determine its position. In a shopping mall or supermarket scenario, the disadvantages of the RFID anchor positioning system include: high system cost, certain cost needed for database to maintain a consistent guide rail RFID position map online and offline, occupation of wireless channels by RFID communication, and impacts on the communication stability and reliability of on-site wireless devices.

In the existing technologies, the self-positioning function of an electronic shelf label is also implemented by a positioning system that endows an ESL at a particular position with the positioning beacon function. An indoor positioning system is implemented by selecting an ESL fixed at a feature position point, and using a large-capacity battery as a standard broadcast beacon. The disadvantages of this system include: an ESL position may vary with SPT width and positional adjustment, affecting the positioning function; signal occlusion caused by changes in the on-site environment will bring uncertainty to the positioning precision; and an ESL endowed with the positioning function as a separate ESL type needs to be managed by an independent management system.

On this basis, in this specification, a position identification method is provided. Through the power supply guide rail design and ESL hardware and software design, this method implements the precise self-positioning capability within an ESL guide rail range, endowing the ESL with the precision positioning anchor capability. This specification also relates to a position identification system, a computing device, a computer-readable storage medium, and a computer program, which will be explained one by one in detail in the following embodiments.

FIG. 1 shows a flow chart of a position identification method provided according to one embodiment of this specification, including step 102, where the position identification method is applied to a position identification system including a power supply guide rail provided with positioning mark information, and an electronic shelf label installed on the power supply guide rail and provided with a photoelectric geminate transistor.

At step 102: the electronic shelf label reads corresponding positioning mark information on the power supply guide rail on the basis of the photoelectric geminate transistor, and determines a target position on the power supply guide rail according to the positioning mark information.

The power supply guide rail may be understood as an apparatus installed on a shelf to supply power to the electronic shelf label. A plurality of electronic shelf labels may be installed on one power supply guide rail to acquire an accurate position of each electronic shelf label, thereby knowing whether each electronic shelf label corresponds to and is consistent with a corresponding commodity, and ensuring that both the commodity and the electronic shelf label are placed in correct positions. The positioning mark information may be understood as information for determining the position of the electronic shelf label on the power supply guide rail.

In a practical application, taking a shopping mall or supermarket scenario as an example, the shopping mall or supermarket includes a plurality of power supply guide rails, a plurality of electronic shelf labels are installed on each power supply guide rail, and each electronic shelf label corresponds to one commodity. In order to ensure the accuracy of correspondence between the electronic shelf labels and the commodities, it is necessary to guarantee that the electronic shelf label is installed in a preset position, and the electronic shelf label in this method therefore reads corresponding positioning mark information through the photoelectric geminate transistor, and determines its position on the power supply guide rail according to the positioning mark information. It should be noted that, compared with other ways of acquiring positioning mark information, this method adopts the photoelectric geminate transistor to read the positioning mark information. Due to the cheap price and simple installation structure of the photoelectric geminate transistor, the position identification method provided in this specification is implemented at low cost and can achieve accurate identification effect at the same time. During a specific implementation, the electronic shelf labels may also be equipped with a background management system, and the background management system may monitor in real time, according to a commodity display list provided by the staff in advance, whether each electronic shelf label is in a correct position, thereby guaranteeing that positions of the electronic shelf labels on all power supply guide rails are correct.

Specifically, the electronic shelf label sends the target position to a controller.

The controller determines installation information of the electronic shelf label according to a commodity display list and the target position, wherein the commodity display list includes commodity placement information and commodity label information corresponding to each commodity, the commodity placement information being used for determining a corresponding relationship between a commodity and a placement position, and the commodity label information being used for determining a corresponding relationship between a commodity and an electronic shelf label.

The controller may be understood as a processor of the background management system. The controller may determine whether an electronic shelf label is in a correct position according to the commodity display list input by the staff. The commodity display list records a corresponding relationship among commodities, positions, and electronic shelf label identifiers. For example, if a position corresponding to a commodity A is in 1st place on a power supply guide rail, and an electronic shelf label identifier corresponding to this position should be an electronic shelf label 1, then after the electronic shelf label 1 sends its target position to the controller, the controller may determine that, according to the commodity display list, the electronic shelf label 1 is installed in the correct position if it is determined that the target position sent by the electronic shelf label 1 corresponds to the relationship in the commodity display list.

After being installed on the power supply guide rail, the electronic shelf label receives power supply from the power supply guide rail. The electronic shelf label will immediately read the positioning mark information on the power supply guide rail on the basis of the photoelectric geminate transistor, thereby determining its target position on the power supply guide rail according to the positioning mark information. The target position may be understood as a relative position of the electronic shelf label on the power supply guide rail. The target position may be the n-th place of the electronic shelf label on the power supply guide rail, or an arrangement order of the electronic shelf label. For example, if there are 10 electronic shelf labels installed on the power supply guide rail, and each electronic shelf label corresponds to one piece of positioning mark information, a specific position of each electronic shelf label on the power supply guide rail may be known according to positioning mark information corresponding to the electronic shelf label, and the arrangement order of the 10 electronic shelf labels may also be determined. That is, the electronic shelf labels on the same power supply guide rail may be sequenced in relative position according to corresponding positioning mark information.

In a practical application, a plurality of electronic shelf labels may be installed on the power supply guide rail, but a position of each electronic shelf label where it is located on the power supply guide rail is not determined. Therefore, the electronic shelf labels may read positioning mark information corresponding to positions where they are located, thereby determining specific positions on the power supply guide rail.

In an embodiment of this specification, the power supply guide rail is provided with positioning mark information which is 00 and 01 respectively. After an electronic shelf label A is installed in a position corresponding to one piece of the positioning mark information, if the positioning mark information of the position where the electronic shelf label is located as read by the same on the basis of the photoelectric geminate transistor is 00, then the electronic shelf label may determine itself is in 1st place on the power supply guide rail, that is, in a position where the positioning mark information is 00.

According to the position identification method provided in the embodiments of this specification, by configuring the positioning mark information on the power supply guide rail, after installing the electronic shelf label on the power supply guide rail, the positioning mark information corresponding to the position where the electronic shelf label is located may be read on the basis of the photoelectric geminate transistor, thereby determining its target position on the power supply guide rail, and implementing the self-positioning function of the electronic shelf label in a low-cost manner.

Specifically, reading the corresponding positioning mark information on the power supply guide rail on the basis of the photoelectric geminate transistor includes:

determining, by the electronic shelf label, an installation position for installing the electronic shelf label on the power supply guide rail, and reading positioning mark information corresponding to the installation position on the basis of the photoelectric geminate transistor.

The installation position may be understood as a position where the electronic shelf label is installed on the power supply guide rail. In a practical application, the power supply guide rail may be provided in such a manner that installation may be performed at any position, and then an installation position corresponding to the electronic shelf label may be determined only after this electronic shelf label is installed on the power supply guide rail. By reading positioning mark information corresponding to this installation position, a target position of the electronic shelf label on the power supply guide rail is then determined.

In an embodiment of this specification, the electronic shelf label may be installed anywhere on the power supply guide rail. After the electronic shelf label A is installed on the power supply guide rail, an installation position of the electronic shelf label A is determined, and the electronic shelf label A reads positioning mark information corresponding to the installation position on the basis of the photoelectric geminate transistor, and determines a target position on the power supply guide rail where it is located.

In another embodiment, the installation position may also be provided in advance on the power supply guide rail. Specifically, reading the corresponding positioning mark information on the power supply guide rail on the basis of the photoelectric geminate transistor includes:

installing the electronic shelf label in an installation position on the power supply guide rail, and reading, by the electronic shelf label, positioning mark information of the installation position on the basis of the photoelectric geminate transistor.

In a practical application, a position where the electronic shelf label may be installed on the power supply guide rail may also be provided in advance. After the electronic shelf label is installed in a certain installation position, the electronic shelf label may read positioning mark information of this installation position through the photoelectric geminate transistor.

In another embodiment of this specification, there are 3 installation positions provided on the power supply guide rail, which are an installation position 1, an installation position 2, and an installation position 3, respectively. After the electronic shelf label A is installed in the installation position 1 on the power supply guide rail, the electronic shelf label A reads positioning mark information corresponding to the installation position 1 on the basis of the photoelectric geminate transistor, and determines a specific position on the power supply guide rail where it is located according to this positioning mark information.

In a practical application, the positioning mark information may be a position code, and then the electronic shelf label may determine the target position on the power supply guide rail according to the position code. Specifically, the positioning mark information includes a position code.

Determining the target position on the power supply guide rail according to the positioning mark information includes:

determining, by the electronic shelf label, the target position on the power supply guide rail according to the position code.

During a specific implementation, the power supply guide rail is configured with a position code, and a binary bar code is adopted as the position code in an embodiment of this specification, as shown in FIG. 2. FIG. 2 shows a schematic diagram of position codes of a power supply guide rail provided according to an embodiment of this specification, where the position codes are configured on the power supply guide rail, and the position codes of the power supply guide rail adopt a binary code, with a black bar representing binary 0, while a white bar representing binary 1. When an electronic shelf label is installed on the power supply guide rail, the electronic shelf label reads a binary code of a position where it is located on the basis of a photoelectric geminate transistor, thereby determining its position on the power supply guide rail. When the position codes are configured on the power supply guide rail, an incremental coding method may be adopted. For example, in FIG. 2, from the left side to the right side are 0000, 0001 . . . 1110. Also, a decremental coding method may be adopted, and then there are 1111, 1110 . . . 0000 from the left side to the right side. It should be noted that two coded information bars in an upper part of the power supply guide rail may be high bits of the binary codes, or may be low bits of the binary codes, and two coded information bars in a lower part of the guide rail may be the low bits of the binary codes, or may be the high bits of the binary codes. A coding order of the position codes on the power supply guide rail, as well as high and low bits of the codes, may be determined according to a practical application scenario, and this specification does not make specific limitations here.

In an embodiment of this specification, position codes 000 to 111 are configured on a power supply guide rail. In order to ensure that each position code may perform coding corresponding to one position, 8 electronic shelf labels may be installed on this power supply guide rail. If the electronic shelf label A, after being installed on this power supply guide rail, reads, through the photoelectric geminate transistor, a position code of a position where it is located, which is 010, then the electronic shelf label may determine that its position on the power supply guide rail is a 3rd position counted from left to right, and subsequently may further determine, through the background management system, whether the position where the electronic shelf label is located is consistent with an expected position, thereby ensuring that the electronic shelf label is installed in a correct position, so that the electronic shelf label has a corresponding relationship with a commodity in the position.

Specifically, the position code includes a binary position code, wherein the number of bits of the binary position code is the same as the number of the photoelectric geminate transistors, the binary position code is determined by black and white stickers, and the photoelectric geminate transistors are aligned with a central area of the binary position code.

Determining, by the electronic shelf label, the target position on the power supply guide rail according to the position code includes:

determining, by the electronic shelf label, the target position on the power supply guide rail according to the binary position code.

In a practical application, the electronic shelf label will convert the binary position code into a target position code, and determine the target position on the power supply guide rail according to the target position code.

The position code may be understood as a binary position code configured on the power supply guide rail. After the electronic shelf label is installed on the power supply guide rail, a binary position code of a position where it is located may be read, the binary position code obtained by reading may be converted into a target position code, and then the target position of the electronic shelf label may be determined. For example, the read binary position code is 0001, and the target position code is a decimal position code, which may also be set to a position code in other number systems, such as an octal position code, a hexadecimal position code, and the like, then the binary position code will be 1 after conversion into the target position code. Since an order of the position codes on the power supply guide rail is from left to right, and 1st place on the left side is 0000, it is therefore determined that the target position corresponding to this electronic shelf label is in 2nd place on the left side.

It should be noted that the number of bits of the binary position code on the power supply guide rail is the same as the number of the photoelectric geminate transistors configured on the electronic shelf label. Each photoelectric geminate transistor can only read a bit in the position code. Furthermore, according to the reading approach of the photoelectric geminate transistor, black and white stickers are adopted to provide the binary position code. If the photoelectric geminate transistor senses a black sticker, then it represents binary 0; and if the photoelectric geminate transistor senses a white sticker, then it represents binary 1. For example, if there are 4 bits in a binary position code 0000, then the electronic shelf label should be configured with 4 photoelectric geminate transistors, with each photoelectric geminate transistor aligned with one bit of the position code. See FIG. 3, which shows a schematic diagram of an electronic shelf label provided in an embodiment of this specification, where a back part of the electronic shelf label is installed with 4 photoelectric geminate transistors, and position codes of the power supply guide rail are identified through the photoelectric geminate transistors, thereby determining a position code corresponding to a position where the electronic shelf label is located. In FIG. 3, the electronic shelf label senses a position code 0010 through the 4 photoelectric geminate transistors. During a specific implementation, on the back part of the electronic shelf label adjoining an area on a bottom surface of the power supply guide rail, the photoelectric geminate transistors are evenly configured in an up-down direction. The number of the configured photoelectric geminate transistors may be determined according to a position code of the power supply guide rail. For example, if there are 5 bits in a position code of the power supply guide rail, then the electronic shelf label will be correspondingly configured with 5 photoelectric geminate transistors. This specification does not make specific limitations on the number of bits in a position code or the number of photoelectric geminate transistors, which may be determined according to an actual case.

During a specific implementation, when the binary position code is provided by using black and white stickers, a blank area may be left in each segment of the binary position code, so as to distinguish different installation positions. When the electronic shelf label is installed in a binary position code area, a normal binary position code may be acquired. When the electronic shelf label is installed in the blank area, an abnormal binary position code may be obtained. Therefore, when the electronic shelf label determines the target position according to the target position code, it is necessary to determine whether the installation position is an abnormal position.

The electronic shelf label acquires an adjacent position code corresponding to an adjacent electronic shelf label of the electronic shelf label in a case where the binary position code is a position code to be verified.

The electronic shelf label determines whether it is in an abnormal position according to the adjacent position code corresponding to the adjacent electronic shelf label; and sends alarm information if so, or if not, determines the target position according to the adjacent position code corresponding to the adjacent electronic shelf label.

The position code to be verified may be understood as a position code corresponding to the blank area. In an embodiment of this specification, since no black or white stickers are provided in the blank area, the position code to be verified is 0000 by default. In a case where the binary position code acquired by the electronic shelf label is 0000, a determination is performed regarding whether a position where it is located is an abnormal position.

The adjacent position code corresponding to the adjacent electronic shelf label may be understood as an adjacent position code corresponding to a part of the power supply guide rail on either side of the electronic shelf label. For example, if an electronic shelf label 1, an electronic shelf label 2 and an electronic shelf label 3 are installed sequentially on the power supply guide rail, adjacent electronic shelf labels of the electronic shelf label 2 are the electronic shelf label 1 and the electronic shelf label 3, and then a specific position of the electronic shelf label 2 may be determined according to adjacent position codes corresponding to the adjacent electronic shelf labels. For example, if an adjacent position code corresponding to the electronic shelf label 1 is 0010, and an adjacent position code corresponding to the electronic shelf label 3 is 0011, then it may be indicated that a target position determined according to a position code 0000 of the electronic shelf label 2 is an abnormal position, and at this time, the electronic shelf label 2 may send alarm information. It should be explained that sending the alarm information by the electronic shelf label may be direct sending of the abnormality alarm information to the background management system to remind the staff that the installation position of this electronic shelf label is incorrect; or a sound apparatus such as a buzzer may be enabled to remind the installation staff to perform reinstallation. This specification does not make specific limitations on an alarm mode of the electronic shelf label, which is determined according to an actual case.

Correspondingly, in another embodiment of this specification, if the only one adjacent electronic shelf label of the electronic shelf label 2 is the electronic shelf label 3, and a position code corresponding to the electronic shelf label 3 is 0001, then it is indicated that when a position code of the electronic shelf label 2 is 0000, the electronic shelf label 2 is installed on the leftmost side of the power supply guide rail, and then the installation position of the electronic shelf label 2 is correct.

In a practical application, since position codes are configured on the power supply guide rail, it is ensured that each electronic shelf label has a position code corresponding to an installation position where it is located. For example, after the electronic shelf label 1 is installed on the power supply guide rail, a position code of a position where it is located is identified as 0000, and after the electronic shelf label 2 is installed on the power supply guide rail, a position code of a position where it is located is identified as 0001, then positioning mark information on the power supply guide rail may be determined according to length information of the power supply guide rail and width information of the electronic shelf labels.

Specifically, the system further includes a controller.

The controller acquires length information of the power supply guide rail and width information of the electronic shelf label, and determines the positioning mark information on the power supply guide rail according to the length information and the width information.

The controller may be understood as a controller in the background management system, and the controller may be used for determining a range of positioning mark information on the power supply guide rail. Determining the positioning mark information of the power supply guide rail according to the length information of the power supply guide rail and the width information of the electronic shelf label is actually to first determine how many electronic shelf labels may be installed on this power supply guide rail, determine a range of positioning mark information according to the number of the installed electronic shelf labels, and determine the positioning mark information on the power supply guide rail according to preset initial positioning mark information.

Specifically, determining the positioning mark information on the power supply guide rail according to the length information and the width information includes:

determining, by the controller, an installable position of the electronic shelf label on the power supply guide rail according to the length information and the width information, and configuring corresponding positioning mark information for the installable position.

In a practical application, in order to guarantee that each electronic shelf label may acquire different position codes, it is therefore necessary to ensure that at most one corresponding electronic shelf label is installed at each position code. Therefore, it is necessary to determine, according to the length information of the power supply guide rail and the width information of electronic shelf labels, the maximum number of electronic shelf labels that may be installed on the power supply guide rail. That is, installable positions for the electronic shelf labels on the power supply guide rail are determined. A position code range of the power supply guide rail is determined according to the installable positions, and corresponding positioning mark information may be configured for each installable position according to preset initial positioning mark information, thereby determining the positioning mark information on the power supply guide rail.

The position code range may be understood as a range of the number of position codes on the power supply guide rail. When position codes on the power supply guide rail are provided with 4 bits, it represents that a position code range of the power supply guide rail is from 0000 to 1111, there are 16 groups of different position codes arranged in total.

In an embodiment of this specification, width information of an electronic shelf label is 7 centimeters (cm), and maximum length information of the power supply guide rail available for installing electronic shelf labels is 90 cm. Therefore, installable positions on the power supply guide rail are calculated as 12, and then the number of installed electronic shelf labels cannot be greater than 12. In order to ensure that the 12 electronic shelf labels have different position codes, the power supply guide rail needs to be arranged with at least 12 groups of position codes. Therefore, it is determined that the power supply guide rail may adopt a binary code with 4 bits. According to preset initial positioning mark information 0000, it is determined that positioning mark information on the power supply guide rail is from 0000 to 1111, which meets the precision demands and ensures that when the electronic shelf labels in the maximum quantity are installed on this power supply guide rail, each electronic shelf label may also be enabled to read different position codes.

In another feasible embodiment of this specification, the electronic shelf label may further determine its target position on the power supply guide rail on the basis of position distribution information. Specifically, the electronic shelf label acquires position distribution information corresponding to the power supply guide rail, and determines the target position of the electronic shelf label on the power supply guide rail from the position distribution information according to the position code.

The position distribution information may be understood as information of corresponding positions of the power supply guide rail and the electronic shelf labels set by the staff in advance. For example, if an electronic shelf label 1 and an electronic shelf label 2 are expectedly installed on the leftmost and rightmost sides of a power supply guide rail A, or an electronic shelf label 3 and an electronic shelf label 4 are installed on the leftmost and rightmost sides of a power supply guide rail B, then such distribution information is recorded in position distribution information. After acquiring position distribution information of the power supply guide rail A, it may be known that what should be installed in 1st place on the leftmost side is the electronic shelf label 1 and what should be installed on the rightmost side is the electronic shelf label 2. According to positioning mark information of the electronic shelf labels, that is, position codes, a search may be performed from the position distribution information, a position corresponding to the electronic shelf label 1, as searched, should be on the leftmost side, and then it may be determined that an actual target position of the electronic shelf label is in 1st place on the left side.

In a practical application, each power supply guide rail may correspond to one piece of position distribution information, or all power supply guide rails may correspond to the same position distribution information. The position distribution information may implement a function of determining whether an electronic shelf label is in a correct position.

In an embodiment of this specification, the position distribution information corresponding to the power supply guide rail A is acquired, and a search is performed from the position distribution information according to positioning mark information of an electronic shelf label, that is, a position code 0000. It is searched that an installation position corresponding to the position code 0000 is on the leftmost side of the power supply guide rail A, and then a target position of the electronic shelf label 1 on the power supply guide rail A is determined to be on the leftmost side of the power supply guide rail.

In a practical application, after the electronic shelf label installed on the power supply guide rail is powered on, or the electronic shelf label is started by its power supply, the electronic shelf label may immediately enter a working state of identifying position codes and acquire a position code of a position where it is located. In the identification process, if the electronic shelf label identifies a plurality of position codes, that is, the position code changes, which indicates that the electronic shelf label is in an area where position codes alternate between black and white, then when the position code changes, the target position of the electronic shelf label may be further accurately determined by utilizing the change of a one-bit or multi-bit marker line state.

Specifically, the electronic shelf label is initially installed on the power supply guide rail, reads positioning mark change information on the basis of the photoelectric geminate transistor, and determines target positioning mark information according to the positioning mark change information.

The positioning mark change information may be understood as information of a change process of the positioning mark information of the electronic shelf label. For example, if an electronic shelf label identifies that the position code changes from 0001 to 0010, then it may be determined that the electronic shelf label, when being installed, is in an area where black and white alternate corresponding to the two position codes. When the electronic shelf label is located in the area where the black and white alternate corresponding to the position codes, an actual position of the electronic shelf label is further determined according to corresponding positioning mark change information.

In a practical application, when an electronic shelf label is just installed on the power supply guide rail, positioning mark information read by the electronic shelf label on the basis of the photoelectric geminate transistor may change, and a target position of the electronic shelf label on the power supply guide rail also needs to be determined according to an installation direction of the electronic shelf label. See FIG. 4, which shows a schematic diagram of installation of an electronic shelf label provided in an embodiment of this specification, where an installation direction is a clockwise direction in which the electronic shelf label is installed on a power supply guide rail. The positioning mark change information in FIG. 4 is 0001-0010. If a position code that changes is at 1st or 2nd bit, a previous state to a final state is taken as a logical state of the position code, and if a position code that changes is at 3rd or 4th bit, a final state is taken as a logical state of the position code. In FIG. 4, as change takes place at the 3rd bit, a final state is taken as a logical state of the position code, then positioning mark information corresponding to the electronic shelf label is 0010, and the target position of the electronic shelf label on the power supply guide rail is determined according to the current positioning mark information.

In an embodiment of this specification, when the electronic shelf label 1 is installed on the power supply guide rail, it is installed in a counterclockwise direction. After acquiring positioning mark information of the electronic shelf label 1, it is found that the positioning mark information of the electronic shelf label 1 changes, with positioning mark change information being 0111-1000. Target positioning mark information corresponding to the electronic shelf label 1 is determined to be "0111", and the target position of the electronic shelf label 1 on the power supply guide rail is determined according to the target positioning mark information.

Specifically, the positioning mark change information includes at least two pieces of positioning mark change information.

Determining, by the electronic shelf label, the target positioning mark information according to the positioning mark change information includes:

calculating, by the electronic shelf label, the target positioning mark information according to the at least two pieces of positioning mark change information.

The positioning mark change information includes at least two pieces of positioning mark information. See FIG. 4, the positioning mark change information in FIG. 4 includes 0001-0000-0010. The target positioning mark information may be understood as positioning mark information finally corresponding to the electronic shelf label calculated according to positioning mark information of the last two states in the positioning mark change information.

In a practical application, calculation of target positioning mark information of the electronic shelf label needs to be determined according to the installation direction. In a case of clockwise installation, if a position code that changes is at 1st or 2nd bit, a previous state to a final state is taken as a logical state of the position code, and if a position code that changes is at 3rd or 4th bit, a final state is taken as a logical state of the position code. For example, if an electronic shelf label is installed clockwise, positioning mark change information corresponding to the electronic shelf label is "0001-0010", then target positioning mark information is calculated as "0010", and the target position of the electronic shelf label on the power supply guide rail is determined according to the target positioning mark information.

In an embodiment of this specification, following the above example, target positioning mark information of an electronic shelf label 1 is calculated as "0111" according to positioning mark change information of the electronic shelf label 1, then the target position of the electronic shelf label 1 on the power supply guide rail is determined according to the target positioning mark information, and the target position is a corresponding installation position of the electronic shelf label at 0111, that is, the 8th place counted from left.

The position identification method provided in this specification is applied to a position identification system including a power supply guide rail provided with positioning mark information, and an electronic shelf label installed on the power supply guide rail, wherein the electronic shelf label is provided with a photoelectric geminate transistor. The electronic shelf label reads corresponding positioning mark information on the power supply guide rail on the basis of the photoelectric geminate transistor, and determines a target position on the power supply guide rail according to the positioning mark information. This method is a low-cost reconstruction on the basis of an existing power supply guide rail and electronic shelf labels, where a binary position code is configured on the power supply guide rail, and a photoelectric geminate transistor is configured on the electronic shelf label, so that the electronic shelf label reads a binary position code of a position where it is located on the power supply guide rail on the basis of the photoelectric geminate transistor, thereby determining its position, and achieving the purpose of the self-positioning of the electronic shelf label. Furthermore, this method is not affected by environmental factors and the like, thereby ensuring the positioning precision.

The position identification method provided in this specification will be further explained below in conjunction with FIG. 5 in which the method is applied, as an example, in a shelf in a shopping mall or supermarket. FIG. 5 shows a flow chart of a processing process of a position identification method provided in an embodiment of this specification, and specific steps include step 502 to step 508.

At step 502: the power supply guide rail supplies power to an electronic shelf label on the power supply guide rail.

The power supply guide rail is a power supply guide rail on the shelf in the shopping mall or supermarket, and there are 3 electronic shelf labels installed on this power supply guide rail, which are an electronic shelf label 1, an electronic shelf label 2 and an electronic shelf label 3, respectively. Each electronic shelf label is installed in a different installation position, and each installation position corresponds to one binary position code.

At step 504: the electronic shelf label determines an installation position where it is installed on the power supply guide rail in a case where it is determined that the power supply guide rail supplies power.

After this power supply guide rail supplies power to the 3 electronic shelf labels, the 3 electronic shelf labels immediately enter a working state of position identification. Each electronic shelf label will determine its installation position. The electronic shelf label 1 determines an installation position 1 where it is installed on the power supply guide rail, the electronic shelf label 2 determines an installation position 2 where it is installed on the power supply guide rail, and the electronic shelf label 3 determines an installation position 3 where it is installed on the power supply guide rail.

At step 506: the electronic shelf label reads positioning mark information corresponding to the installation position on the basis of the photoelectric geminate transistor.

Since there are only 3 installable positions provided on the power supply guide rail, positioning mark information on this power supply guide rail is set to a 2-bit binary position code, thereby ensuring that each installable position corresponds to a different binary position code, and then there are 2 photoelectric geminate transistors installed on each electronic shelf label. The electronic shelf label 1 reads positioning mark information corresponding to the installation position on the basis of the photoelectric geminate transistor, which is a binary position code 00; the electronic shelf label 2 reads positioning mark information corresponding to the installation position on the basis of the photoelectric geminate transistor, which is a binary position code 01; and the electronic shelf label 3 reads positioning mark information corresponding to the installation position on the basis of the photoelectric geminate transistor, which is a binary position code 10.

At step 508: the electronic shelf label determines a target position on the power supply guide rail according to the positioning mark information.

After the electronic shelf label 1 reads the binary position code 00, the binary position code 00 is converted into a decimal position code 0, and then a target position of the electronic shelf label 1 on the power supply guide rail is determined to be a 0th bit, that is, 1st place on the left side. After the electronic shelf label 2 reads the binary position code 01, the binary position code 01 is converted into a decimal position code 1, and then a target position of the electronic shelf label 2 on the power supply guide rail is determined to be a 1st bit, that is, 2nd place on the left side. After the electronic shelf label 3 reads the binary position code 10, the binary position code 10 is converted into a decimal position code 2, and then a target position of the electronic shelf label 3 on the power supply guide rail is determined to be a 2nd bit, that is, 3rd place on the left side. Subsequently, on the basis of a corresponding relationship between an electronic shelf label and a commodity, it may be further determined whether the corresponding relationship of the electronic shelf label with the commodity is correct.

In the position identification method applied to a shelf in a shopping mall or supermarket provided in an embodiment of this specification, the system includes a power supply guide rail provided with positioning mark information, and an electronic shelf label installed on the power supply guide rail and provided with a photoelectric geminate transistor. The power supply guide rail supplies power to the electronic shelf label on the power supply guide rail. The electronic shelf label determines an installation position where it is installed on the power supply guide rail in a case where it is determined that the power supply guide rail supplies power, reads positioning mark information corresponding to the installation position on the basis of the photoelectric geminate transistor, and determines a target position on the power supply guide rail according to the positioning mark information. This method is a low-cost reconstruction on the basis of an existing power supply guide rail and electronic shelf labels, where a binary position code is configured on the power supply guide rail, and a photoelectric geminate transistor is configured on the electronic shelf label, so that the electronic shelf label reads a binary position code of a position where it is located on the power supply guide rail on the basis of the photoelectric geminate transistor, thereby determining its position, and achieving the purpose of the self-positioning of the electronic shelf label. Furthermore, this method is not affected by environmental factors and the like, thereby ensuring the positioning precision.

Corresponding to the above method embodiments, this specification further provides a position identification system embodiment. FIG. 6 shows a schematic structural diagram of a position identification system 600 provided in an embodiment of this specification. As shown in FIG. 6, this system includes: a power supply guide rail 602 provided with positioning mark information, and an electronic shelf label 604 installed on the power supply guide rail and provided with a photoelectric geminate transistor.

The electronic shelf label 604 is configured to read corresponding positioning mark information on the power supply guide rail on the basis of the photoelectric geminate transistor, and determine a target position on the power supply guide rail according to the positioning mark information.

Optionally, the electronic shelf label 604 is further configured to:

determine an installation position where the electronic shelf label is installed on the power supply guide rail, and read positioning mark information corresponding to the installation position on the basis of the photoelectric geminate transistor.

Optionally, the electronic shelf label 604 is further configured in such a manner that:

the electronic shelf label identifies a position code of the power supply guide rail on the basis of a code identification module.

Optionally, it is installed in an installation position on the power supply guide rail, and positioning mark information of the installation position is read on the basis of the photoelectric geminate transistor.

Optionally, the positioning mark information includes a position code; and the electronic shelf label 604 is further configured in such a manner that:

the electronic shelf label determines the target position on the power supply guide rail according to the position code.

Optionally, the position code includes a binary position code, wherein the number of bits of the binary position code is the same as the number of the photoelectric geminate transistors, the binary position code is determined by black and white stickers, and the photoelectric geminate transistors are aligned with a central area of the binary position code; and the electronic shelf label 604 is further configured in such a manner that:

the electronic shelf label determines the target position on the power supply guide rail according to the binary position code.

Optionally, the electronic shelf label 604 is further configured in such a manner that:

the electronic shelf label acquires an adjacent position code corresponding to an adjacent electronic shelf label of the electronic shelf label in a case where the binary position code is a position code to be verified; and the electronic shelf label determines whether it is in an abnormal position according to the adjacent position code corresponding to the adjacent electronic shelf label; and sends alarm information if so, or if not, determines the target position according to the adjacent position code corresponding to the adjacent electronic shelf label.

Optionally, the system further includes a controller.

The controller is configured to acquire length information of the power supply guide rail and width information of the electronic shelf label, and determine the positioning mark information on the power supply guide rail according to the length information and the width information.

Optionally, the controller is further configured to:

determine an installable position of the electronic shelf label on the power supply guide rail according to the length information and the width information, and configure corresponding positioning mark information for the installable position.

Optionally, the electronic shelf label 604 is further configured to:

read, in a case where it is initially installed on the power supply guide rail and the power supply guide rail supplies power, positioning mark change information on the basis of the photoelectric geminate transistor, and determine the target positioning mark information according to the positioning mark change information.

Optionally, the electronic shelf label 604 is further configured in such a manner that:

the electronic shelf label calculates the target positioning mark information according to at least two pieces of positioning mark change information.

Optionally, the electronic shelf label 604 is further configured in such a manner that:

the electronic shelf label sends the target position to the controller.

The controller determines installation information of the electronic shelf label according to a commodity display list and the target position, wherein the commodity display list comprises commodity placement information and commodity label information corresponding to each commodity, the commodity placement information being used for determining a corresponding relationship between a commodity and a placement position, and the commodity label information being used for determining a corresponding relationship between a commodity and an electronic shelf label.

The position identification system provided in this specification includes a power supply guide rail provided with positioning mark information, and an electronic shelf label installed on the power supply guide rail and provided with a photoelectric geminate transistor. The electronic shelf label reads corresponding positioning mark information on the power supply guide rail on the basis of the photoelectric geminate transistor, and determines a target position on the power supply guide rail according to the positioning mark information. By determining the target position of the electronic shelf label on the power supply guide rail according to the positioning mark information of the electronic shelf label on the power supply guide rail, the self-positioning capability of the electronic shelf label is implemented at low cost, and the accuracy of positioning can be ensured.

Described above is a schematic solution of the position identification system in this embodiment. It should be noted that the technical solution of this position identification system and the technical solution of the above position identification method belong to the same concept. For any details not detailed in the technical solution of the position identification system, reference may be made to the description of the technical solution of the above position identification method.

FIG. 7 shows a structural block diagram of a computing device 700 provided according to an embodiment of this specification. Parts of this computing device 700 include, but are not limited to, a memory 710 and a processor 720. The processor 720 is connected with the memory 710 through a bus 730, and a database 750 is used for saving data.

The computing device 700 further includes an access device 740 that enables the computing device 700 to communicate via one or more networks 760. Examples of these networks include a public switched telephone network (PSTN), a local area network (LAN), a wide area network (WAN), a personal area network (PAN), or a combination of communication networks such as the Internet. The access device 740 may include one or more of any types of wired or wireless network interfaces (e.g., a network interface card (NIC)), such as an IEEE 802.11 wireless local area network (WLAN) wireless interface, a worldwide interoperability for microwave access (Wi-MAX) interface, an Ethernet interface, a universal serial bus (USB) interface, a cellular network interface, a Bluetooth interface, a near field communication (NFC) interface, and the like.

In an embodiment of this specification, the above parts of the computing device 700 and other parts not shown in FIG. 7 may also be connected to each other through, for example, a bus. It should be understood that the structural block diagram of the computing device shown in FIG. 7 is for illustrative purposes only and does not limit the scope of this specification. Those skilled in the art may add or replace other parts as needed.

The computing device 700 may be any type of stationary or mobile computing device, including a mobile computer or mobile computing device (e.g., a tablet computer, a personal digital assistant, a laptop computer, a notebook computer, a netbook, etc.), a mobile phone (e.g., a smart phone), a wearable computing device (e.g., a smart watch, smart glasses, etc.), or other types of computing devices, or a stationary computing device such as a desktop computer or PC. The computing device 700 may also be a mobile or stationary server.

The processor 720 is used for implementing, when executing the computer instructions, the steps of the position identification method as described.

Described above is a schematic solution of the computing device in this embodiment. It should be noted that the technical solution of the computing device and the technical solution of the above position identification method belong to the same concept. For any details not detailed in the technical solution of the computing device, reference may be made to the description of the technical solution of the above position identification method.

An embodiment of this specification further provides a computer-readable storage medium, which stores computer instructions that, when executed by a processor, implement the steps of the position identification method as described above.

Described above is a schematic solution of the computer-readable storage medium in this embodiment. It should be noted that the technical solution of this storage medium and the technical solution of the above position identification method belong to the same concept. For any details not detailed in the technical solution of the storage medium, reference may be made to the description of the technical solution of the above position identification method.

An embodiment of this specification further provides a computer program, wherein when the computer program is executed in a computer, the computer is caused to execute the steps of the above position identification method.

Described above is a schematic solution of the computer program in this embodiment. It should be noted that the technical solution of this computer program and the technical solution of the above position identification method belong to the same concept. For any details not detailed in the technical solution of the computer program, reference may be made to the description of the technical solution of the above position identification method.

Described above are particular embodiments of this specification. Other embodiments are within the scope of the appended claims. In some cases, actions or steps recorded in the claims may be executed in a different order from those in the embodiments, and may still achieve desired results. Additionally, processes depicted in the drawings do not necessarily require a particular or consecutive order as shown to achieve desired results. In some implementations, multitasking and parallel processing are also possible or may be advantageous.

The computer instructions include computer program codes, which may be in a source code form, an object code form, an executable file, or some intermediate forms. The computer-readable medium may include: any entity or apparatus capable of carrying the computer program codes, a recording medium, a USB flash drive, a portable hard drive, a magnetic disc, an optical disc, a computer memory, a read-only memory (ROM), a random-access memory (RAM), an electrical carrier signal, a telecommunications signal, and a software distribution medium. It should be noted that content contained in the computer-readable medium may be appropriately increased or decreased according to the requirements of legislation and patent practice in a jurisdiction. For example, in some jurisdictions, according to legislation and patent practice, a computer-readable medium does not include an electrical carrier signal or a telecommunication signal.

It should be noted that for the convenience of description, the method embodiments described precedingly are all expressed as combinations of a series of actions. However, those skilled in the art should be aware that the embodiments of this specification are not limited by the described action orders, because according to the embodiments of this specification, certain steps may proceed in other sequences or at the same time. Furthermore, those skilled in the art should also be aware that the embodiments described in the specification are all preferred embodiments, and the actions and modules involved are not all definitely necessary for the embodiments of this specification.

In the above embodiments, different focuses are put on their respective descriptions. For parts not detailed in a certain embodiment, reference may be made to the relevant descriptions of other embodiments.

The preferred embodiments of this specification as disclosed above are merely used to help elaborate this specification. The optional embodiments neither exhaustively recite all the details, nor limit the invention to the specific implementations as described. Obviously, according to the content of the embodiments of this specification, many modifications and variations may be conducted. These embodiments are selected and specifically described in this specification in order to better explain the principles and practical applications of the embodiments of this specification, such that those skilled in the art can well understand and utilize this specification. This specification is limited only by the claims and their entire scope and equivalents.

What is claimed is:

1. A position identification method, applied to a position identification system comprising a power supply guide rail provided with positioning mark information, and an electronic shelf label installed on the power supply guide rail and provided with a photoelectric geminate transistor, wherein the method comprises:

reading, by the electronic shelf label, corresponding positioning mark information on the power supply guide rail on the basis of the photoelectric geminate transistor, and determining, by the electronic shelf label, a target position on the power supply guide rail according to the positioning mark information;

wherein the positioning mark information comprises a position code; and determining the target position on the power supply guide rail according to the positioning mark information comprises:

determining, by the electronic shelf label, the target position on the power supply guide rail according to the position code.

2. The method of claim 1, wherein reading the corresponding positioning mark information on the power supply guide rail on the basis of the photoelectric geminate transistor comprises:

determining, by the electronic shelf label, an installation position where the electronic shelf label is installed on the power supply guide rail, and reading, by the electronic shelf label, positioning mark information corresponding to the installation position on the basis of the photoelectric geminate transistor.

3. The method of claim 1, wherein reading the corresponding positioning mark information on the power supply guide rail on the basis of the photoelectric geminate transistor comprises:

installing the electronic shelf label in an installation position on the power supply guide rail, and reading, by the electronic shelf label, positioning mark information of the installation position on the basis of the photoelectric geminate transistor.

4. The method of claim 1, wherein the position code comprises a binary position code, wherein the number of bits of the binary position code is the same as the number of photoelectric geminate transistors, the binary position code is determined by black and white stickers, and the photoelectric geminate transistors are aligned with a central area of the binary position code; and determining, by the electronic shelf label, the target position on the power supply guide rail according to the position code comprises:

determining, by the electronic shelf label, the target position on the power supply guide rail according to the binary position code.

5. The method of claim 4, wherein determining the target position on the power supply guide rail according to the binary position code comprises:

acquiring, by the electronic shelf label, an adjacent position code corresponding to an adjacent electronic shelf label of the electronic shelf label in a case where the binary position code is a position code to be verified; and determining, by the electronic shelf label, whether the electronic shelf label is in an abnormal position according to the adjacent position code corresponding to the adjacent electronic shelflabel; and if it is determined that the electronic shelf label is in the abnormal position, sending alarm information; or if it is determined that the electronic shelf label is not in the abnormal position, determining the target position according to the adjacent position code corresponding to the adjacent electronic shelf label.

6. The method of claim 1, further comprising:

reading, by the electronic shelf label which is initially installed on the power supply guide rail, positioning mark change information on the basis of the photoelectric geminate transistor, and determining, by the electronic shelf label, target positioning mark information according to the positioning mark change information.

7. The method of claim 6, wherein the positioning mark change information comprises at least two pieces of positioning mark change information; and determining, by the electronic shelf label, the target positioning mark information according to the positioning mark change information comprises:

calculating, by the electronic shelf label, the target positioning mark information according to the at least two pieces of positioning mark change information.

8. The method of claim 1, wherein the system further comprises a controller, wherein the method further comprises:

sending, by the electronic shelf label, the target position to the controller; and determining, by the controller, installation information of the electronic shelf label according to a commodity display list and the target position, wherein the commodity display list comprises commodity placement information and commodity label information corresponding to each commodity, the commodity placement information being used for determining a corresponding relationship between a commodity and a placement position, and the commodity label information being used for determining a corresponding relationship between a commodity and an electronic shelf label.

9. A computing device, comprising a memory, a processor and computer instructions stored in the memory and executable on the processor, wherein the processor, when executing the computer instructions, implements steps of the method of claim 1.

10. A non-transitory computer-readable storage medium, which stores computer-executable instructions that, when executed by a processor, implement steps of the method of claim 1.

11. A position identification system, comprising a power supply guide rail provided with positioning mark information, and an electronic shelf label installed on the power supply guide rail and provided with a photoelectric geminate transistor, wherein:

the electronic shelf label is configured to read corresponding positioning mark information on the power supply guide rail on the basis of the photoelectric geminate transistor, and determine a target position on the power supply guide rail according to the positioning mark information;

wherein the positioning mark information comprises a position code; and the electronic shelf label is further configured to:

determine the target position on the power supply guide rail according to the position code.

12. The system of claim 11, wherein the electronic shelf label is further configured to:

determine an installation position where the electronic shelf label is installed on the power supply guide rail, and read positioning mark information corresponding to the installation position on the basis of the photoelectric geminate transistor.

13. The system of claim 11, wherein the electronic shelf label is further configured to:

install in an installation position on the power supply guide rail, and read positioning mark information of the installation position on the basis of the photoelectric geminate transistor.

14. The system of claim 11, wherein the position code comprises a binary position code, wherein the number of bits of the binary position code is the same as the number of photoelectric geminate transistors, the binary position code is determined by black and white stickers, and the photoelectric geminate transistors are aligned with a central area of the binary position code; and the electronic shelf label is further configured to:

determine the target position on the power supply guide rail according to the binary position code.

15. The system of claim 14, wherein the electronic shelf label is further configured to:

acquire an adjacent position code corresponding to an adjacent electronic shelf label of the electronic shelf label in a case where the binary position code is a position code to be verified; and determine whether the electronic shelf label is in an abnormal position according to the adjacent position code corresponding to the adjacent electronic shelf label; and if it is determined that the electronic shelf label is in the abnormal position, sending alarm information; or if it is determined that the electronic shelf label is not in the abnormal position, determine the target position according to the adjacent position code corresponding to the adjacent electronic shelf label.

16. The system of claim 11, wherein the electronic shelf label is initially installed on the power supply guide rail, and is further configured to:

read positioning mark change information on the basis of the photoelectric geminate transistor, and determine target positioning mark information according to the positioning mark change information.

17. The system of claim 16, wherein the positioning mark change information comprises at least two pieces of positioning mark change information; and the electronic shelf label is further configured to:

determine the target positioning mark information according to the positioning mark change information comprises:

calculate the target positioning mark information according to the at least two pieces of positioning mark change information.

18. The system of claim 11, wherein the system further comprises a controller; and the electronic shelf label is further configured to:

send the target position to the controller;

the controller is configured to:

determine installation information of the electronic shelf label according to a commodity display list and the target position, wherein the commodity display list comprises commodity placement information and commodity label information corresponding to each commodity, the commodity placement information being used for determining a corresponding relationship between a commodity and a placement position, and the commodity label information being used for determining a corresponding relationship between a commodity and an electronic shelf label.

* * * * *